United States Patent
Kataoka et al.

(10) Patent No.: US 11,513,086 B2
(45) Date of Patent: Nov. 29, 2022

(54) X-RAY FLUORESCENCE SPECTROMETER

(71) Applicant: RIGAKU CORPORATION, Akishima (JP)

(72) Inventors: Yoshiyuki Kataoka, Otsu (JP); Yasuhiko Nagoshi, Kobe (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 17/733,626

(22) Filed: Apr. 29, 2022

(65) Prior Publication Data

US 2022/0260506 A1 Aug. 18, 2022

Related U.S. Application Data

(63) Continuation of application No. PCT/JP2021/006935, filed on Feb. 24, 2021.

(30) Foreign Application Priority Data

May 18, 2020 (JP) .............................. JP2020-086629

(51) Int. Cl.
  *G01N 23/207* (2018.01)
  *G01N 23/2209* (2018.01)
  *G01N 23/223* (2006.01)

(52) U.S. Cl.
  CPC ....... *G01N 23/2076* (2013.01); *G01N 23/223* (2013.01); *G01N 23/2209* (2018.02);
  (Continued)

(58) Field of Classification Search
  None
  See application file for complete search history.

(56) References Cited

U.S. PATENT DOCUMENTS

| 7,256,400 | B2* | 8/2007 | Takahashi | ............ | G01N 23/225 250/307 |
| 7,504,627 | B2* | 3/2009 | Takahashi | ............ | G01N 23/225 250/307 |

(Continued)

FOREIGN PATENT DOCUMENTS

| CN | 101661008 A | 3/2010 |
| CN | 206274315 U * | 6/2017 |

(Continued)

OTHER PUBLICATIONS

International Search Report for PCT/JP2021/006935 dated May 18, 2021 [PCT/ISA/210].

(Continued)

*Primary Examiner* — Thomas R Artman
(74) *Attorney, Agent, or Firm* — Sughrue Mion, PLLC

(57) ABSTRACT

A sequential X-ray fluorescence spectrometer according to the present invention includes a total analysis time display unit configured to measure, for each kind of analytical sample, a standard sample which contains a component at a known content as a standard value to determine a measured intensity of each measurement line corresponding to the component. The total analysis time display unit is further configured to calculate, for each component, a counting time which gives a specified analytical precision by using the standard value and the measured intensity and to calculate a total counting time as a sum of the counting times of respective components. The total analysis time display unit is configured to calculate a total analysis time as a sum of the total counting time and a total non-counting time and to output the calculated total analysis time and the calculated counting times of the respective components.

9 Claims, 6 Drawing Sheets

(52) U.S. Cl.
CPC ............ *G01N 2223/076* (2013.01); *G01N 2223/1016* (2013.01); *G01N 2223/304* (2013.01); *G01N 2223/306* (2013.01); *G01N 2223/3037* (2013.01); *G01N 2223/33* (2013.01); *G01N 2223/611* (2013.01); *G01N 2223/633* (2013.01); *G01N 2223/64* (2013.01)

(56) References Cited

U.S. PATENT DOCUMENTS

| | | | |
|---|---|---|---|
| 10,082,475 | B2 | 9/2018 | Hara et al. |
| 10,161,889 | B2 | 12/2018 | Hara et al. |
| 10,921,267 | B2 | 2/2021 | Kataoka et al. |
| 10,948,438 | B1 | 3/2021 | Kita et al. |
| 2005/0234672 | A1* | 10/2005 | Takahashi ............ G01N 23/225 702/95 |
| 2007/0272860 | A1* | 11/2007 | Takahashi ............ G01N 23/225 250/310 |
| 2018/0106736 | A1 | 4/2018 | Hara et al. |
| 2018/0180563 | A1 | 6/2018 | Hara et al. |
| 2020/0003712 | A1 | 1/2020 | Kataoka et al. |
| 2021/0088459 | A1 | 3/2021 | Kita et al. |
| 2022/0178853 | A1* | 6/2022 | Kataoka ................. G01B 15/02 |
| 2022/0260506 | A1* | 8/2022 | Kataoka ............. G01N 23/2076 |

FOREIGN PATENT DOCUMENTS

| | | |
|---|---|---|
| CN | 107209132 A | 9/2017 |
| CN | 107923859 A | 4/2018 |
| CN | 110312928 A | 10/2019 |
| CN | 112074728 A | 12/2020 |
| JP | 2592134 Y2 * | 3/1999 |
| JP | 2000-065765 A | 3/2000 |
| JP | 2000-074857 A | 3/2000 |
| JP | 2002310953 A * | 10/2002 |
| JP | 2010-078592 A | 4/2010 |
| JP | 2012-007928 A | 1/2012 |
| JP | 6601854 B1 | 11/2019 |
| WO | 2019/244432 A1 | 12/2019 |

OTHER PUBLICATIONS

Written Opinion for PCT/JP2021/006935 dated May 18, 2021 [PCT/ISA/237].

Communication dated Jul. 26, 2022 from The State Intellectual Property Office of People's Republic of China in Application No. 202180006207.8.

* cited by examiner

SAMPLE INTRODUCTION: 25 SEC

MEASUREMENT           : 70 SEC
(TOTAL COUNTING TIME OF 11 COMPONENTS: 26 SEC)

SAMPLE REMOVAL        : 23 SEC

TOTAL                 : 118 SEC

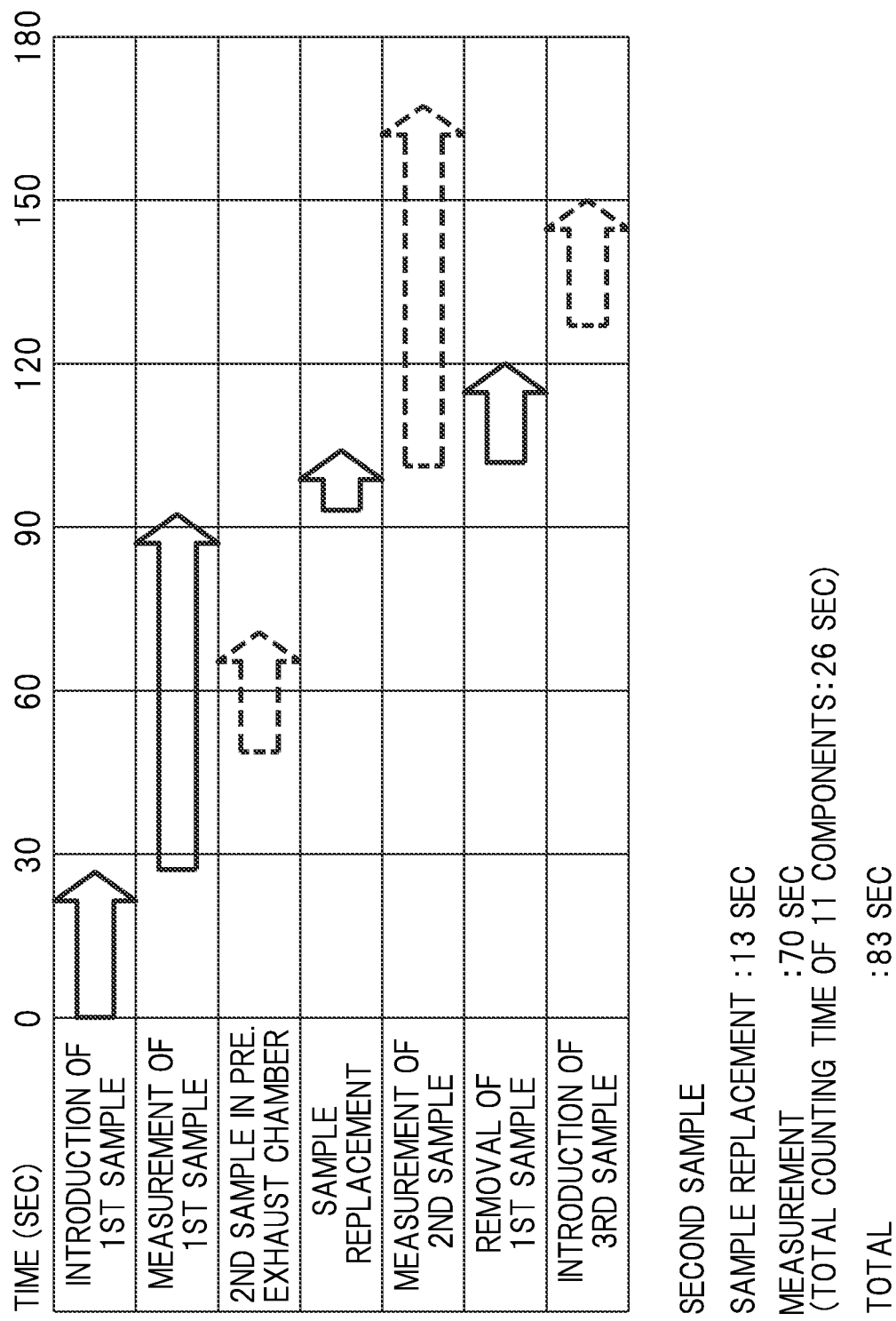

Fig. 3

● CALCULATE COUNTING TIME
○ CALCULATE PRECISION
○ SPECIFY TOTAL ANALYSIS TIME

| ANALYTICAL COMPONENT | CONTENT | MEASUREMENT LINE | SPECIFIED PRECISION | X-RAY INTENSITY | TOTAL ANALYSIS TIME (SEC) | COUNTING TIME | ESTIMATED PRECISION |
|---|---|---|---|---|---|---|---|
| | mass% | | mass% | kcps | 116 | SEC | mass% |
| Fe2O3 | 3.51 | Fe-KA | 0.01 | 10.123 | TOTAL DRIVE TIME (SEC) 60 | 12 | 0.0101 |
| Al2O3 | 1.23 | Al-KA | 0.008 | 1.461 | | 16 | 0.0080 |
| SiO2 | 5.12 | Si-KA | 0.01 | 9.321 | TOTAL COUNTING TIME (SEC) 56 | 28 | 0.0100 |

Fig. 4

○ CALCULATE COUNTING TIME
● CALCULATE PRECISION
○ SPECIFY TOTAL ANALYSIS TIME

| ANALYTICAL COMPONENT | CONTENT | MEASUREMENT LINE | SPECIFIED PRECISION | X-RAY INTENSITY | COUNTING TIME | ESTIMATED PRECISION |
|---|---|---|---|---|---|---|
| | mass% | | mass% | kcps | SEC | mass% |
| Fe2O3 | 3.51 | Fe-KA | | 10.123 | 10 | 0.0110 |
| Al2O3 | 1.23 | Al-KA | | 1.461 | 12 | 0.0093 |
| SiO2 | 5.12 | Si-KA | | 9.321 | 20 | 0.0119 |

| TOTAL ANALYSIS TIME (SEC) | 102 |
| TOTAL DRIVE TIME (SEC) | 60 |
| TOTAL COUNTING TIME (SEC) | 42 |

X-RAY FLUORESCENCE SPECTROMETER

CROSS REFERENCE TO THE RELATED APPLICATION

This application is a continuation application, under 35 U.S.C. § 111(a), of international application No. PCT/JP2021/006935, filed Feb. 24, 2021, which claims priority to Japanese patent application No. 2020-086629, filed May 18, 2020, the entire disclosures of all of which are herein incorporated by reference as a part of this application.

BACKGROUND OF THE INVENTION

Field of the Invention

The present invention relates to a sequential X-ray fluorescence spectrometer configured to irradiate a sample with primary X-rays to measure an intensity of fluorescent X-rays generated and perform quantitative analysis of various samples.

Description of Related Art

In quantitative analysis using a sequential X-ray fluorescence spectrometer, a goniometer is operated for each analytical element corresponding to an analytical component to count an X-ray intensity at a specified 2θ angle, and the obtained X-ray intensity is used in quantitative calculation, for example, by the calibration curve method. A measurement precision of the X-ray intensity of each component depends on the X-ray intensity and a counting time. With regard to the measurement precision of the X-ray intensity, where the influence of counting loss on the X-ray intensity can be ignored, a precision of an integrated intensity (count c), which represents a count value of the X-ray intensity, is calculated as a square root of the integrated intensity. This phenomenon is called as statistical fluctuation. Where it is assumed that the precision of the X-ray intensity follows statistical fluctuation, the precision $\sigma_I$ (kcps) of the X-ray intensity can be calculated using formula (1) below, in which "I" denotes an X-ray intensity expressed in kcps, and "T" denotes a counting time expressed in seconds.

$$\sigma_I = (I/(T \times 1000))^{1/2} \quad (1)$$

Formula (1) may be converted into formula (2) below to calculate a counting time T which gives a specified precision of the X-ray intensity.

$$T = I/(\sigma_I^2 \times 1000) \quad (2)$$

In order to determine a counting time using this relation, some spectrometers calculate, with an assumption that a relative precision of an X-ray intensity matches a relative precision of an analytical value (a relative precision of a concentration), a counting time such that the relative precision of the X-ray intensity, i.e., the relative precision of the analytical value attains a specified value (for example, Patent Document 1).

RELATED DOCUMENT

Patent Document

[Patent Document 1] JP Laid-open Patent Publication No. 2000-074857

SUMMARY OF THE INVENTION

In this way, conventionally, a total analysis time required for an entire analysis of one sample is estimated using only the counting time in the calculation. In an actual analysis, however, a total analysis time of each sample includes a time for transferring the sample from an external sample changer located outside a spectrometer into the spectrometer, driving a goniometer for respective analytical components to complete measurements of all of the specified components, and removing the sample to the external sample changer. Where many components are analyzed with a long counting time (for example, about 40 seconds) per component, a sum of counting times of all the analytical components approximates the total analysis time. In an analysis of a cement or the like, however, a counting time per component is often set short (for example, several seconds or shorter), so that the total counting time is significantly shorter than the total analysis time.

The information of the total analysis time is important not only when considering a throughput such as the number of analyzable samples per hour in a case of continuous measurement of many samples, but also when rapidly analyzing only one sample such as in a case of a fore-furnace analysis. However, where only the counting time(s) is/are calculated and outputted as in a conventional manner, the total counting time may be significantly different from the total analysis time, so that it has been difficult to determine a suitable counting time(s) to obtain a necessary analytical precision(s).

An object of the present invention is to provide an X-ray fluorescence spectrometer which makes it possible to easily know a total analysis time and to determine a counting time which gives a necessary analytical precision.

In order to achieve the above object, a sequential X-ray fluorescence spectrometer according to present invention is configured to irradiate a sample placed at a measurement position with primary X-rays and to determine a content of a component in the sample on the basis of a measured intensity of fluorescent X-rays generated. A sample transfer time represents, in a case of continuous measurement of a plurality of samples, a time required for replacement of one sample at the measurement position and, in a case of measurement of only one sample, a time required for introduction of that sample to the measurement position from outside of the sequential X-ray fluorescence spectrometer and removal of that sample from the measurement position to the outside of the sequential X-ray fluorescence spectrometer. A total measurement condition change time represents a total time required for changing a measurement condition so as to correspond to each measurement line, which represents fluorescent X-rays having an intensity to be measured, for a sample placed at the measurement position. A total counting time represents a sum of counting times of respective measurement lines for a sample placed at the measurement position. A total non-counting time represents a sum of the sample transfer time and the total measurement condition change time. A total analysis time represents a sum of the total counting time and the total non-counting time.

The sequential X-ray fluorescence spectrometer includes a total analysis time display unit configured to output the total analysis time to a display module. The total analysis time display unit is configured to measure, for each kind of analytical sample, a standard sample which contains a component at a known content as a standard value to determine a measured intensity of each measurement line corresponding to the component.

In the sequential X-ray fluorescence spectrometer according to a first aspect of the present invention, the total analysis time display unit is further configured to calculate, for each component, a counting time which gives a specified analytical precision by using the standard value and the measured intensity and to calculate the total counting time as a sum of the counting times of respective components. The total analysis time display unit is configured to calculate the total analysis time as a sum of the total counting time and the total non-counting time and to output the calculated total analysis time and the calculated counting times of the respective components.

According to the first aspect, it is possible to set a necessary analytical precision (as used herein, the "necessary analytical precision" and the like is not a single value but has an acceptable range) while looking at the total analysis time and the counting times of the respective components displayed on the display module. This makes it possible to determine an appropriate counting time. Thus, according to the first aspect, it is possible to easily know a total analysis time and to determine a counting time which gives a necessary analytical precision.

In the sequential X-ray fluorescence spectrometer according to a second aspect of the present invention, the total analysis time display unit is further configured to calculate, for each component, an analytical precision which is obtained with a specified counting time by using the standard value and the measured intensity and to calculate the total counting time as a sum of the specified counting times of respective components. The total analysis time display unit is configured to calculate the total analysis time as a sum of the total counting time and the total non-counting time and to output the calculated total analysis time and the calculated analytical precisions of the respective components.

According to the second aspect, it is possible to calculate analytical precisions with varying counting times for a certain component and to determine counting times of respective components while looking at the total analysis time displayed on the display module. Thus, according to the second aspect, it is possible to easily know a total analysis time and to determine a counting time which gives a necessary analytical precision.

In the sequential X-ray fluorescence spectrometer according to a third aspect of the present invention, the total analysis time display unit is further configured to calculate the total counting time by subtracting the total non-counting time from a specified total analysis time and to calculate counting times of respective components by using the total counting time and respective preset counting time ratios. The total analysis time display unit is configured to calculate, for each component, an analytical precision which is obtained with the calculated counting time by using the standard value and the measured intensity and to output the specified total analysis time and the calculated analytical precisions of the respective components.

According to the third aspect, it is possible to, for instance, check analytical precisions of respective components obtained with a total analysis time set short, and thereby to suitably set a total analysis time so as to determine counting times of the respective components which give necessary analytical precisions. Thus, according to the third aspect, it is possible to easily know a total analysis time and to determine a counting time which gives a necessary analytical precision.

In the present invention, for an arbitrary sample containing a plurality of components, the sample transfer time and the total measurement condition change time may be measured, and an average measurement condition change time per component may be calculated; and the total analysis time display unit may be configured to store the measured sample transfer time and the calculated average measurement condition change time per component and to calculate the total non-counting time on the basis of the stored sample transfer time and the stored average measurement condition change time per component, as well as the number of components of the analytical sample.

Alternatively, for each kind of sample, an arbitrary sample may be measured with a provisional counting time set for each component, and a total analysis time may be measured, in the case of continuous measurement of a plurality of samples, as a time from placement of one sample at the measurement position to placement of a next sample at the measurement position and, in the case of measurement of only one sample, as a time from introduction of that sample from outside of the sequential X-ray fluorescence spectrometer to removal of that sample to the outside of the sequential X-ray fluorescence spectrometer; the total non-counting time may be calculated by subtracting the total counting time which is a sum of the provisional counting times of the respective components from the measured total analysis time; and the total analysis time display unit may be configured to store the calculated total non-counting time.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures, FIG. 1 schematically shows an X-ray fluorescence spectrometer according to an embodiment of the present invention;

FIG. 2B shows another example of an analysis time chart of the X-ray fluorescence spectrometer;

FIG. 3 shows an example of an operation screen of the X-ray fluorescence spectrometer;

FIG. 4 shows another example of an operation screen of the X-ray fluorescence spectrometer.

DESCRIPTION OF EMBODIMENTS

Figure 1:
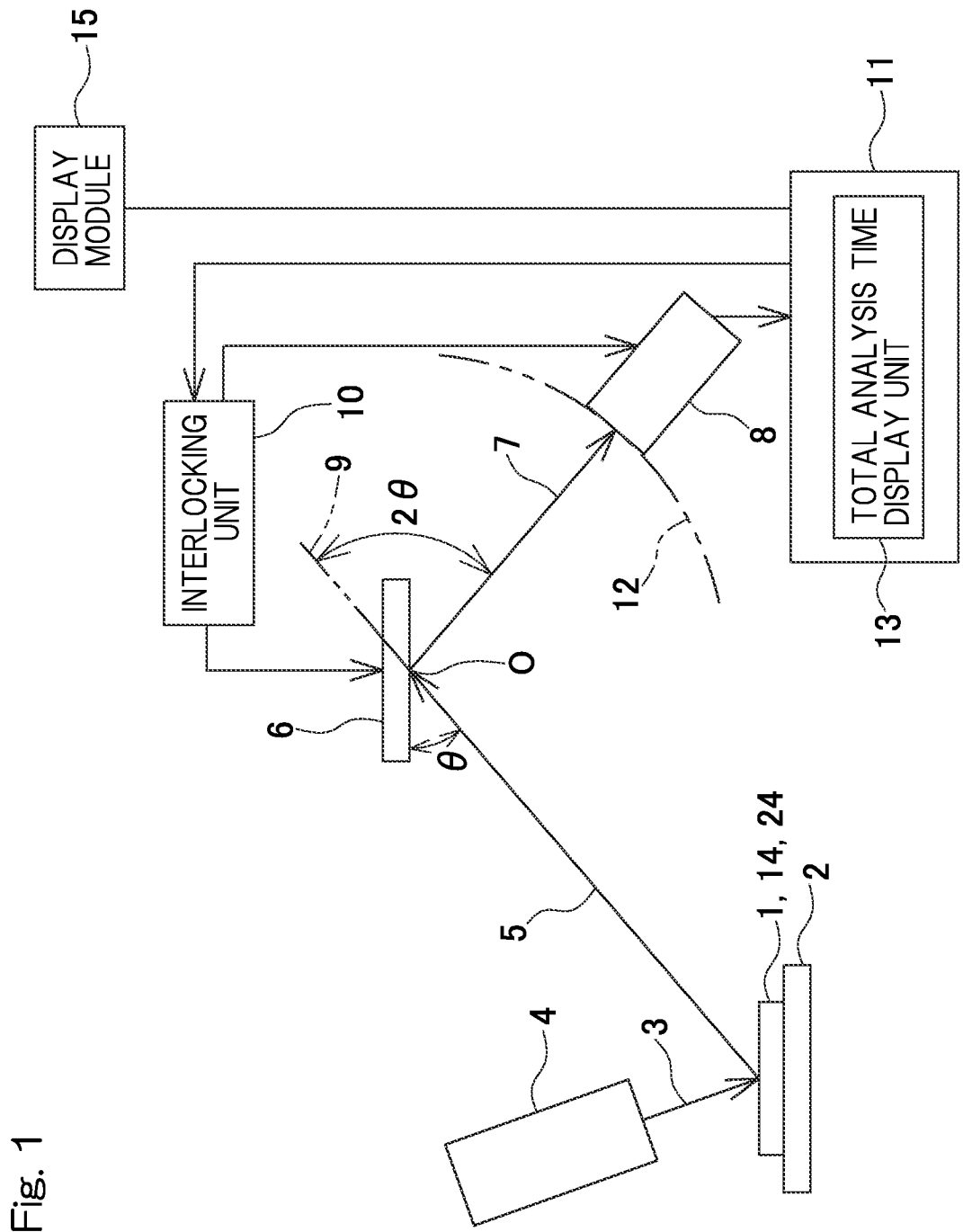

Hereinafter, a preferable embodiment of the present invention will be described with reference to the drawings. As shown in FIG. 1, this is a sequential X-ray fluorescence spectrometer configured to irradiate a sample 1, 14, 24 (including an analytical sample (so-called unknown sample) 1, a standard sample 14, and an arbitrary sample 24 containing a plurality of components) placed at a measurement position with primary X-rays 3 and to determine a quantitative value (analytical value) of a content of a component in the sample 1 and/or a quantitative value of a thickness of the sample 1 on the basis of a measured intensity of secondary X-rays 5 generated. The X-ray fluorescence spectrometer includes: a sample stage 2 on which the sample 1, 14, 24 is placed; an X-ray source 4 such as an X-ray tube which irradiates the sample 1, 14, 24 with the primary X-rays 3; a spectroscopic device 6 which monochromates the secondary X-rays 5 such as fluorescent X-rays generated from the sample 1, 14, 24; and a detector 8 which detects the secondary X-rays 7 monochromated by the spectroscopic device 6. An output of the detector 8 is counted as an intensity of the secondary X-rays 7 through an amplifier, a pulse height analyzer, and a counter (none illustrated) and is inputted into a control unit 11 such as a computer which controls the entire spectrometer.

This is a wavelength dispersive and sequential X-ray fluorescence spectrometer and includes an interlocking unit 10 (i.e., a so-called goniometer) which interlocks the spectroscopic device 6 with the detector 8 so as to vary a wavelength of the secondary X-rays 7 entering the detector 8. When the secondary X-rays 5 enter the spectroscopic device 6 at a certain incident angle θ, an extension line 9 of the secondary X-rays 5 and the secondary X-rays 7 monochromated (diffracted) by the spectroscopic device 6 form a spectroscopic angle 2θ, which is twice as large as the incident angle θ. The interlocking unit 10 turns the spectroscopic device 6 by a rotation angle about an axis O perpendicular to a plane which passes through the center of a surface of the spectroscopic device and turns the detector 8 by an angle twice as large as the rotation angle about the axis O along a circle 12 so as to change the spectroscopic angle 2θ to vary the wavelength of the secondary X-rays 7 to be monochromated, while the monochromated secondary X-rays 7 enters the detector 8. A value of the spectroscopic angle 2θ (2θ angle) is inputted from the interlocking unit 10 into the control unit 11.

The control unit 11 stops the interlocking unit 10 for a predetermined counting time at a spectroscopic angle 2θ corresponding to each measurement line, which represents secondary X-rays 5 having an intensity to be measured, to obtain a measured intensity. The spectrometer of this embodiment includes, as a program installed in the control unit 11, a total analysis time display unit 13 configured to output a total analysis time as described later to a display module 15. The display module 15 may be, for example, a display, a monitor, or the like. The measured intensity of each measurement line may be a gross intensity obtained by measuring only a peak or a net intensity obtained by measuring a peak and a background and subtracting the background from the peak. Even where a relative precision of an X-ray intensity does not match a relative precision of an analytical value, it is possible to calculate a proportion of fluctuation in analytical values of each component to fluctuation in X-ray intensities to calculate an analytical precision and/or a counting time.

As used herein, a "sample transfer time" represents, in a case of continuous measurement of a plurality of samples, a time required for replacement of one sample 1, 14, 24 at the measurement position and, in a case of measurement of only one sample, a time required for introduction of that sample 1, 14, 24 to the measurement position from outside of the sequential X-ray fluorescence spectrometer and removal of that sample from the measurement position to the outside of the sequential X-ray fluorescence spectrometer. A "total measurement condition change time" represents a total time required for changing a measurement condition so as to correspond to each measurement line, which represents fluorescent X-rays having an intensity to be measured, for a sample 1, 14, 24 placed at the measurement position. Further, a "total counting time" represents a sum of counting times of respective measurement lines for a sample 1, 14, 24 placed at the measurement position. A "total non-counting time" represents a sum of the sample transfer time and the total measurement condition change time. A "total analysis time" represents a sum of the total counting time and the total non-counting time.

There are two types of mechanisms for sample transfer in a sequential X-ray fluorescence spectrometer. A first type is configured to bring a sample to a measurement position from an external sample changer located outside of a sequential X-ray fluorescence spectrometer, to remove the sample from the measurement position to the external sample changer upon completion of measurement, and then to bring a next sample to the measurement position from the external sample changer. A second type is configured, in a sequential X-ray fluorescence spectrometer which includes thereinside a preliminary exhaust chamber and an internal sample exchanging mechanism for exchanging a sample in the preliminary exhaust chamber and a sample at a measurement position, to transfer a sample in the order of the external sample changer, the preliminary exhaust chamber, the measurement position, the preliminary exhaust chamber, and then the external sample changer. In this type of mechanism, while a sample at the measurement position is measured, a next sample waits in the preliminary exhaust chamber, and once the measurement of the sample at the measurement position is completed, the sample in the preliminary exhaust chamber is replaced with the sample at the measurement position (for example, JP Laid-open Patent Publication No. 2005-98906).

In the case of the first type, a sample transfer time in continuous measurement of a plurality of samples is the same as a sample transfer time in measurement of only one sample. In contrast, in the case of the second type, a sample transfer time in continuous measurement of a plurality of samples is remarkably shortened as compared with a sample transfer time in measurement of only one sample and only includes a time required for replacing a sample in the preliminary exhaust chamber with a sample at the measurement position.

The total non-counting time may be determined, for example, by the following two methods.

[First Method]

For an arbitrary sample containing a plurality of components (for example, 10 components), a sample transfer time and a total measurement condition change time are measured, and an average measurement condition change time per component is calculated. The sample transfer time may be measured as a sum of an introduction time required for transferring a sample from outside of the sequential X-ray fluorescence spectrometer to a measurement position and a removal time required for transferring the sample from the measurement position to the outside of the sequential X-ray fluorescence spectrometer if the introduction time and the removal time are separately measured.

The average measurement condition change time per component represents, when an arbitrary sample is measured for a plurality of components under a measurement condition such as a provisional counting time, a time obtained by dividing, by the number of components (the number of measured components) of the arbitrary sample, a measured total measurement condition change time which is obtained by subtracting a total counting time of the all components from a time (measurement time) from the start of measurement of a first component to the end of measurement of a last component. That is, it is a mean measurement condition change time when measuring one component, which includes times for e.g. changing a tube voltage and a tube current of an X-ray tube, driving a goniometer, and changing a spectroscopic device. The measured sample transfer time and the calculated average measurement condition change time per component in the first method can be applied regardless of the kind of sample. However, it is desirable that the sample transfer time is measured for each measurement atmosphere, such as vacuum and helium.

The total analysis time display unit stores the measured sample transfer time and the calculated average measurement condition change time per component. The sample transfer time may be stored in a divided manner as the introduction time and the removal time in the case as described above. The total analysis time display unit calculates a total non-counting time on the basis of the stored sample transfer time and the stored average measurement condition change time per component, as well as the number of components of the analytical sample (the number of analytical components). Specifically, the total non-counting time is calculated by adding, to the sample transfer time, a time obtained by multiplying the average measurement condition change time per component by the number of components of the analytical sample.

[Second Method]

For each kind of sample, an arbitrary sample is measured with a provisional counting time set for each component; the total analysis time is measured, in the case of continuous measurement of a plurality of samples, as a time from placement of one sample at a measurement position to placement of a next sample at the measurement position and, in a case of measurement of only one sample, as a time from introduction of that sample from outside of the sequential X-ray fluorescence spectrometer to removal of that sample to the outside of the sequential X-ray fluorescence spectrometer; and a total non-counting time is calculated by subtracting the total counting time which is a sum of the provisional counting times of the respective components from the measured total analysis time. The total non-counting time in the second method is calculated for each kind of sample and may be applied to samples of the same kind.

The total analysis time display unit stores the calculated total non-counting time. It should be noted that in continuous measurement of a plurality of samples, a time from placement of one sample at a measurement position to placement of a next sample at the measurement position is equal to a time from the start of measurement of the one sample to the start of measurement of the next sample and is equal to a time from the end of measurement of the one sample to the end of measurement of the next sample.

Figure 2A:
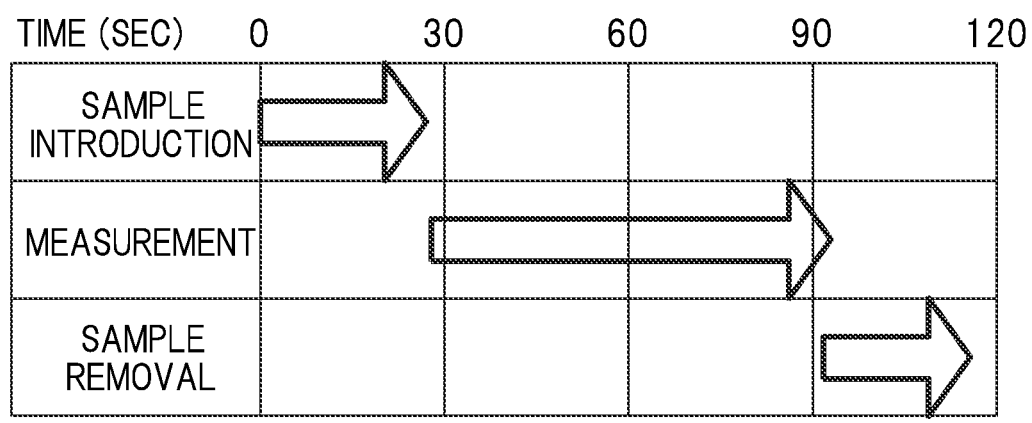
FIG. 2A shows an example of an analysis time chart of the X-ray fluorescence spectrometer.

Hereinafter, a specific example will be given to describe calculation of the total non-counting time. FIG. 2A shows an example of an analysis time chart obtained by measuring required times in measurement of only one cement sample using a sequential X-ray fluorescence spectrometer of the second type. In this case, according to the first method, the sample transfer time is measured as 48 seconds (25 seconds+ 23 seconds), the total measurement condition change time is measured as 44 seconds (70 seconds–26 seconds), and the average measurement condition change time per component is calculated as 4 seconds (44 seconds/11). Then, the total non-counting time is calculated as 92 seconds by adding, to the sample transfer time of 48 seconds, a time of 44 seconds which is obtained by multiplying the average measurement condition change time per component of 4 seconds by the number of components (for example, 11) of the analytical sample.

In the same case, according to the second method, the total analysis time is measured as 118 seconds, and the total non-counting time is calculated as 92 seconds by subtracting the total counting time of 26 seconds which is a sum of provisional counting times of the respective components from the measured total analysis time of 118 seconds.

FIG. 2B shows an example of an analysis time chart obtained by measuring required times in continuous measurement of a plurality of cement samples using a sequential X-ray fluorescence spectrometer of the second type. In this case, with a focus on the second sample, according to the first method, the sample transfer time is measured as 13 seconds, the total measurement condition change time is measured as 44 seconds (70 seconds–26 seconds), and the average measurement condition change time per component is calculated as 4 seconds (44 seconds/11). Then, the total non-counting time is calculated as 57 seconds by adding, to the sample transfer time of 13 seconds, a time of 44 seconds which is obtained by multiplying the average measurement condition change time per component of 4 seconds by the number of components (for example, 11) of the analytical sample.

In the same case, according to the second method, the total analysis time is measured as 83 seconds, and the total non-counting time is calculated as 57 seconds by subtracting the total counting time of 26 seconds which is a sum of provisional counting times of the respective components from the measured total analysis time of 83 seconds. Although in a case of continuous measurement of a plurality of samples using the sequential X-ray fluorescence spectrometer of the second type, the first sample and the last sample have a different (longer) sample transfer time from that of other samples, there is no problem if the difference in the sample transfer times is ignored in the present invention which calculates the total non-counting time as an approximate value of a time required for the analysis other than the counting time. In the sequential X-ray fluorescence spectrometer of the first type, an analysis time chart in a case of continuous measurement of a plurality of samples is a mere repetition of the analysis time chart in a case of measurement of only one sample, and as described above, a sample transfer time in continuous measurement of a plurality of samples is equal to a sample transfer time in measurement of only one sample.

Figure 5:
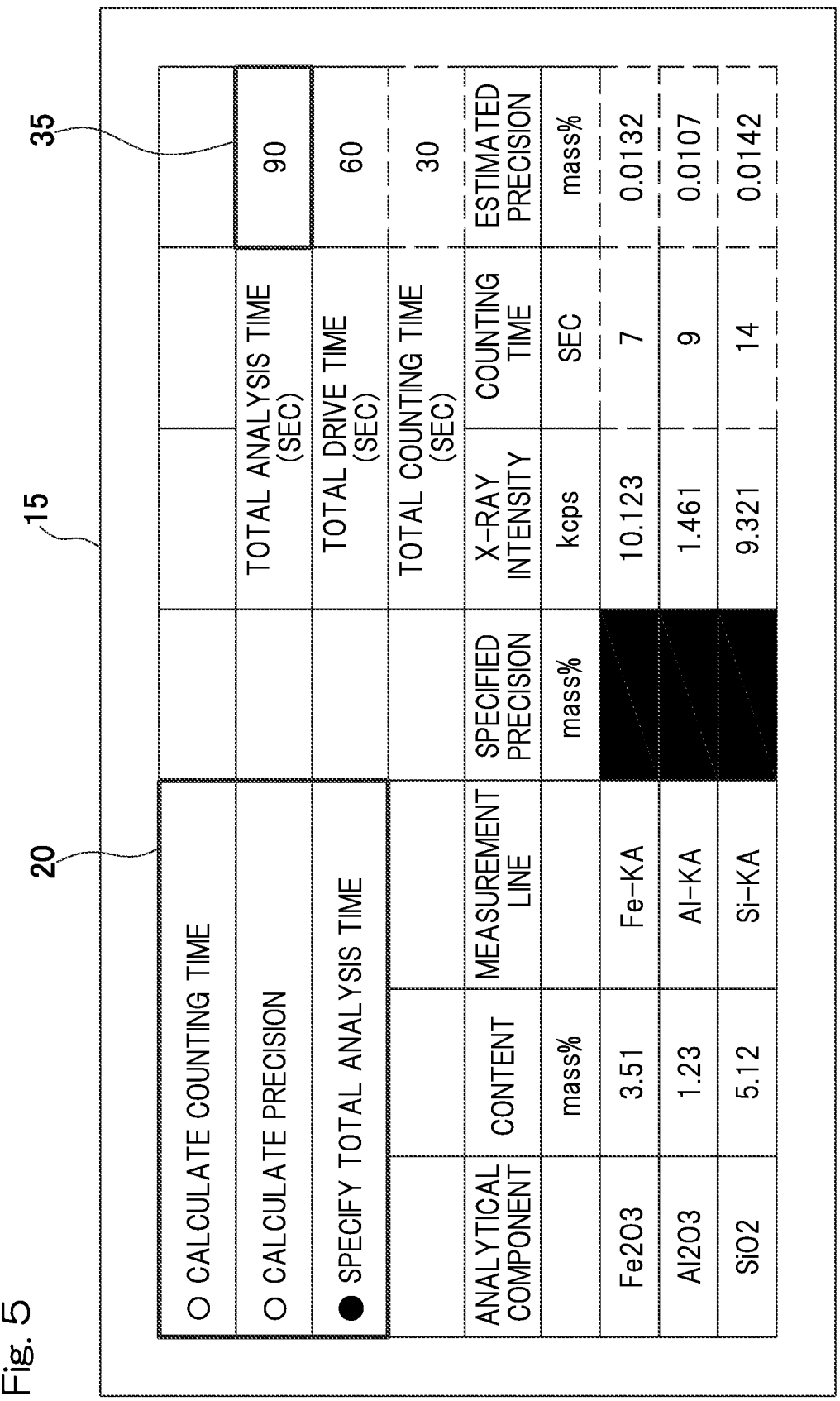
FIG. 5 shows yet another example of an operation screen of the X-ray fluorescence spectrometer.

Next, an operation of the total analysis time display unit 13 will be described. The total analysis time display unit 13 measures, for each kind of analytical sample, e.g., for the kind of an analytical sample 1 which contains three components, a standard sample 14 which contains these components at known contents as standard values, and determines measured intensities of respective measurement lines corresponding to these components. Specifically, where three components of $Fe_2O_3$, $Al_2O_3$, and $SiO_2$ are analyzed, the measurement lines corresponding to these components are Fe-Kα line, Al-Kα line, and Si-Kα line, respectively. In FIG. 3 to FIG. 5, Fe-Kα line, Al-Kα line, and Si-Kα line are expressed as Fe-KA line, Al-KA line, Si-KA line, respectively, and the total non-counting time is expressed as total drive time.

The total analysis time display unit 13 also calculates, for example, according to the first method as described with reference to FIG. 2A, a total non-counting time on the basis of a stored sample transfer time of 48 seconds (in a case of measurement of only one sample) and a stored average measurement condition change time per component of 4 seconds, as well as the number of components ("3") of the analytical sample. Specifically, the total non-counting time of 60 seconds is calculated by adding, to the sample transfer time of 48 seconds, a time of 12 seconds which is obtained by multiplying the average measurement condition change time per component of 4 seconds by the number of components ("3") of the analytical sample. As described with reference to FIG. 2B, in a case of continuous measurement of a plurality of samples, the sample transfer time is 13 seconds. A non-illustrated option button may be used to select, on an operation screen as described later, which sample transfer time is used.

Where analytical precisions are specified, the total analysis time display unit 13 calculates, for each component, a counting time which gives a specified analytical precision by using the standard value and the measured intensity, calculates the total counting time as a sum of the counting times of the respective components, calculates the total analysis time as a sum of the total counting time and the total non-counting time as calculated above, and outputs the calculated total analysis time and the calculated counting times of the respective components. This will be described in detail below.

FIG. 3 shows an example of an operation screen in a case where analytical precisions are specified. In the following description, the left and right sides of the screen correspond to the left and right sides as viewed by a user who looks at the screen, respectively. First, "CALCULATE COUNTING TIME" is selected with an option button 20 at an upper left part of the screen. Next, analytical precisions of the three components are inputted into text boxes 25 (bolded) for specified precisions. The analytical precisions may be inputted, for example, via a keyboard, a numeric keypad, a touch panel or the like.

Once the analytical precisions are inputted and a non-illustrated calculation start button is pushed, the total analysis time display unit 13 first calculates, with an assumption that a relative precision of an analytical value (here, a content) matches a relative precision of an X-ray intensity of a corresponding measurement line, a precision $\sigma_I$ of the X-ray intensity necessary for a specified analytical precision $\sigma_W$ using formula (3) below.

$$\sigma_I = I \times (\sigma_W/W) \quad (3)$$

W: content (standard value)
I: X-ray intensity (measured intensity)

Next, the total analysis time display unit 13 calculates a counting time which gives the precision $\sigma_I$ of the X-ray intensity, using the above formula (2). In an actual X-ray fluorescence spectrometer, a minimum unit is defined for the counting time. Here, the minimum unit is 1 second, and the counting time is obtained by rounding up or rounding off to the nearest integer.

The total analysis time display unit 13 further calculates a total counting time from the (rounded) counting times for the respective components and calculates the total analysis time as a sum of the total counting time and the total non-counting time as calculated above. In the example of FIG. 3, the total analysis time, the total non-counting time (total drive time), and the total counting time are displayed at an upper right part of the screen.

For confirmation purposes, analytical precisions $\sigma_C$ may be calculated from the obtained counting times T of the respective components using formula (4) below and be displayed. In the example of FIG. 3, the calculated analytical precisions are displayed as estimated precisions at a lower right part of the screen. It should be noted that in this example, the calculations are performed with an assumption that a relative precision of an analytical value matches a relative precision of an X-ray intensity.

$$\sigma_C = W \times (\sigma_I/I) = W/(T \times I \times 1000)^{1/2} \quad (4)$$

According to the example of FIG. 3, it is possible to set a necessary analytical precision while looking at the total analysis time and the counting times of the respective components displayed on the display module 15. This makes it possible to determine an appropriate counting time. Thus, according to the example of FIG. 3, it is possible to easily know a total analysis time and to determine a counting time which gives a necessary analytical precision.

Where counting times are specified, the total analysis time display unit 13 calculates, for each component, an analytical precision which is obtained with a specified counting time by using the standard value and the measured intensity, calculates the total counting time as a sum of the specified counting times of the respective components, calculates the total analysis time as a sum of the total counting time and the total non-counting time as calculated above, and outputs the calculated total analysis time and the calculated analytical precisions of the respective components. This will be described in detail below.

FIG. 4 shows an example of an operation screen in a case where counting times are specified. First, "CALCULATE PRECISION" is selected with an option button 20 at an upper left part of the screen. Next, counting times of the three components are inputted into text boxes 30 (bolded) for the counting time.

Once the counting times are inputted and a non-illustrated calculation start button is pushed, the total analysis time display unit 13 calculates a precision of an X-ray intensity using the above formula (1). Next, the total analysis time display unit 13 calculates an analytical precision on the basis of the precision of the X-ray intensity using the above formula (4) and displays the analytical precision as an estimated precision (in a dashed box at a lower right part of the screen). The total analysis time display unit also updates indications (in dashed boxes at an upper right part of the screen) of a total counting time and a total analysis time (which is calculated as a sum of the total counting time and the total non-counting time as calculated above) on the basis of the set counting times of the respective components. The total counting time and the total analysis time may be updated immediately after input of the counting times.

According to the example of FIG. 4, it is possible to calculate precisions with varying counting times for a certain component and to determine counting times of respective components while looking at the total analysis time displayed on the display module 15. Thus, according to the example of FIG. 4, it is possible to easily know a total analysis time and to determine a counting time which gives a necessary analytical precision.

Where a total analysis time is specified, the total analysis time display unit 13 calculates a total counting time by subtracting a total non-counting time as calculated above from the specified total analysis time, calculates counting times of respective components by using the total counting time and respective preset counting time ratios, calculates, for each component, an analytical precision which is obtained with the calculated counting time by using the standard value and the measured intensity, and outputs the specified total analysis time and the calculated analytical precisions of the respective components. This will be described in detail below.

FIG. 5 shows an operation screen of a in a case where a total analysis time is specified. First, "SPECIFY TOTAL ANALYSIS TIME" is selected with an option button 20 at an upper left part of the screen. Next, the total analysis time is inputted into a text box 35 (bolded) for the total analysis time at an upper right part of the screen.

Once the total analysis time is inputted and a non-illustrated calculation start button is pushed, the total analysis time display unit 13 calculates a total counting time by subtracting a total non-counting time (total drive time) as calculated above from the specified total analysis time.

Next, the total analysis time display unit 13 calculates respective counting times on the basis of respective preset counting time ratios (in the example of FIG. 5, counting time ratios in FIG. 4 are used) and the calculated total counting time (in this example, 30 seconds). As with the case where the counting times are specified, the total analysis time display unit 13 further calculates analytical precisions of the respective components on the basis of the individual counting times using formula (1) and formula (4) and displays the analytical precisions as estimated precisions on the display module 15 (in dashed boxes at a lower right part of the screen).

According to the example of FIG. 5, it is possible to, for instance, check analytical precisions of respective components obtained with a total analysis time set short, and thereby to suitably set a total analysis time so as to determine counting times of the respective components which give necessary analytical precisions. Thus, according to the example of FIG. 5, it is possible to easily know a total analysis time and to determine a counting time which gives a necessary analytical precision.

In the above examples of FIG. 3 to FIG. 5, only peaks are measured, and calculations are performed with an assumption that a relative precision of an X-ray intensity matches a relative precision of an analytical value. However, the present invention may be applied in a case where a background is also measured to determine a net intensity. In addition, even where a relative precision of an X-ray intensity does not match a relative precision of an analytical value, it is possible to calculate a proportion of fluctuation in analytical values of each component to fluctuation in X-ray intensities to calculate an analytical precision and/or a counting time.

Although the present invention has been described in terms of the preferred examples thereof with reference to the drawings, those skilled in the art would readily arrive at various changes and modifications in view of the present specification without departing from the scope of the invention. Accordingly, such changes and modifications are included within the scope of the present invention defined by the appended claims.

REFERENCE NUMERALS 1, 14, 24 . . . sample
1 . . . analytical sample
3 . . . primary X-rays
5 . . . secondary X-rays (fluorescent X-rays)
13 . . . total analysis time display unit
14 . . . standard sample
15 . . . display module
24 . . . arbitrary sample containing a plurality of components

What is claimed is:

1. A sequential X-ray fluorescence spectrometer configured to irradiate a sample placed at a measurement position with primary X-rays and to determine a content of a component in the sample on the basis of a measured intensity of fluorescent X-rays generated,
wherein a sample transfer time represents, in a case of continuous measurement of a plurality of samples, a time required for replacement of one sample at the measurement position and, in a case of measurement of only one sample, a time required for introduction of that sample to the measurement position from outside of the sequential X-ray fluorescence spectrometer and removal of that sample from the measurement position to the outside of the sequential X-ray fluorescence spectrometer,
a total measurement condition change time represents a total time required for changing a measurement condition so as to correspond to each measurement line, which represents fluorescent X-rays having an intensity to be measured, for a sample placed at the measurement position,
a total counting time represents a sum of counting times of respective measurement lines for a sample placed at the measurement position,
a total non-counting time represents a sum of the sample transfer time and the total measurement condition change time,
a total analysis time represents a sum of the total counting time and the total non-counting time,
the sequential X-ray fluorescence spectrometer comprises a total analysis time display unit configured to output the total analysis time to a display module,
the total analysis time display unit is configured:
to measure, for each kind of analytical sample, a standard sample which contains a component at a known content as a standard value to determine a measured intensity of each measurement line corresponding to the component,
to calculate, for each component, a counting time which gives a specified analytical precision by using the standard value and the measured intensity and to calculate the total counting time as a sum of the counting times of respective components, and
to calculate the total analysis time as a sum of the total counting time and the total non-counting time and to output the calculated total analysis time and the calculated counting times of the respective components.

2. The sequential X-ray fluorescence spectrometer as claimed in claim 1, wherein for an arbitrary sample containing a plurality of components, the sample transfer time and the total measurement condition change time are measured, and an average measurement condition change time per component is calculated, and
the total analysis time display unit is configured to store the measured sample transfer time and the calculated average measurement condition change time per component and to calculate the total non-counting time on the basis of the stored sample transfer time and the stored average measurement condition change time per component, as well as the number of components of the analytical sample.

3. The sequential X-ray fluorescence spectrometer as claimed in claim 1, wherein for each kind of sample, an arbitrary sample is measured with a provisional counting time set for each component, and the total analysis time is measured, in the case of continuous measurement of a plurality of samples, as a time from placement of one sample at the measurement position to placement of a next sample at the measurement position and, in the case of measurement of only one sample, as a time from introduction of that sample from outside of the sequential X-ray fluorescence spectrometer to removal of that sample to the outside of the sequential X-ray fluorescence spectrometer; the total non-counting time is calculated by subtracting the total counting time which is a sum of the provisional counting times of the respective components from the measured total analysis time, and the total analysis time display unit is configured to store the calculated total non-counting time.

4. A sequential X-ray fluorescence spectrometer configured to irradiate a sample placed at a measurement position with primary X-rays and to determine a content of a component in the sample on the basis of a measured intensity of fluorescent X-rays generated, wherein a sample transfer time represents, in a case of continuous measurement of a plurality of samples, a time required for replacement of one sample at the measurement position and, in a case of measurement of only one sample, a time required for introduction of that sample to the measurement position from outside of the sequential X-ray fluorescence spectrometer and removal of that sample from the measurement position to the outside of the sequential X-ray fluorescence spectrometer, a total measurement condition change time represents a total time required for changing a measurement condition so as to correspond to each measurement line, which represents fluorescent X-rays having an intensity to be measured, for a sample placed at the measurement position, a total counting time represents a sum of counting times of respective measurement lines for a sample placed at the measurement position, a total non-counting time represents a sum of the sample transfer time and the total measurement condition change time, a total analysis time represents a sum of the total counting time and the total non-counting time, the sequential X-ray fluorescence spectrometer comprises a total analysis time display unit configured to output the total analysis time to a display module, the total analysis time display unit is configured:

to measure, for each kind of analytical sample, a standard sample which contains a component at a known content as a standard value to determine a measured intensity of each measurement line corresponding to the component, to calculate, for each component, an analytical precision which is obtained with a specified counting time by using the standard value and the measured intensity and to calculate the total counting time as a sum of the specified counting times of respective components, and to calculate the total analysis time as a sum of the total counting time and the total non-counting time and to output the calculated total analysis time and the calculated analytical precisions of the respective components.

5. The sequential X-ray fluorescence spectrometer as claimed in claim 4, wherein for an arbitrary sample containing a plurality of components, the sample transfer time and the total measurement condition change time are measured, and an average measurement condition change time per component is calculated, and the total analysis time display unit is configured to store the measured sample transfer time and the calculated average measurement condition change time per component and to calculate the total non-counting time on the basis of the stored sample transfer time and the stored average measurement condition change time per component, as well as the number of components of the analytical sample.

6. The sequential X-ray fluorescence spectrometer as claimed in claim 4, wherein for each kind of sample, an arbitrary sample is measured with a provisional counting time set for each component, and the total analysis time is measured, in the case of continuous measurement of a plurality of samples, as a time from placement of one sample at the measurement position to placement of a next sample at the measurement position and, in the case of measurement of only one sample, as a time from introduction of that sample from outside of the sequential X-ray fluorescence spectrometer to removal of that sample to the outside of the sequential X-ray fluorescence spectrometer; the total non-counting time is calculated by subtracting the total counting time which is a sum of the provisional counting times of the respective components from the measured total analysis time, and the total analysis time display unit is configured to store the calculated total non-counting time.

7. A sequential X-ray fluorescence spectrometer configured to irradiate a sample placed at a measurement position with primary X-rays and to determine a content of a component in the sample on the basis of a measured intensity of fluorescent X-rays generated, wherein a sample transfer time represents, in a case of continuous measurement of a plurality of samples, a time required for replacement of one sample at the measurement position and, in a case of measurement of only one sample, a time required for introduction of that sample to the measurement position from outside of the sequential X-ray fluorescence spectrometer and removal of that sample from the measurement position to the outside of the sequential X-ray fluorescence spectrometer, a total measurement condition change time represents a total time required for changing a measurement condition so as to correspond to each measurement line, which represents fluorescent X-rays having an intensity to be measured, for a sample placed at the measurement position, a total counting time represents a sum of counting times of respective measurement lines for a sample placed at the measurement position, a total non-counting time represents a sum of the sample transfer time and the total measurement condition change time, a total analysis time represents a sum of the total counting time and the total non-counting time, the sequential X-ray fluorescence spectrometer comprises a total analysis time display unit configured to output the total analysis time to a display module, the total analysis time display unit is configured:

to measure, for each kind of analytical sample, a standard sample which contains a component at a known content as a standard value to determine a measured intensity of each measurement line corresponding to the component, to calculate the total counting time by subtracting the total non-counting time from a specified total analysis time and to calculate counting times of respective components by using the total counting time and respective preset counting time ratios, to calculate, for each component, an analytical precision which is obtained with the calculated counting time by using the standard value and the measured intensity, and to output the specified total analysis time and the calculated analytical precisions of the respective components.

8. The sequential X-ray fluorescence spectrometer as claimed in claim 7, wherein for an arbitrary sample containing a plurality of components, the sample transfer time and the total measurement condition change time are measured, and an average measurement condition change time per component is calculated, and the total analysis time display unit is configured to store the measured sample transfer time and the calculated average measurement condition change time per component and to calculate the total non-counting time on the basis of the stored sample transfer time and the stored average measurement condition change time per component, as well as the number of components of the analytical sample.

9. The sequential X-ray fluorescence spectrometer as claimed in claim 7, wherein for each kind of sample, an arbitrary sample is measured with a provisional counting time set for each component, and the total analysis time is measured, in the case of continuous measurement of a plurality of samples, as a time from placement of one sample at the measurement position to placement of a next sample at the measurement position and, in the case of measurement of only one sample, as a time from introduction of that sample from outside of the sequential X-ray fluorescence spectrometer to removal of that sample to the outside of the sequential X-ray fluorescence spectrometer; the total non-counting time is calculated by subtracting the total counting time which is a sum of the provisional counting times of the respective components from the measured total analysis time, and the total analysis time display unit is configured to store the calculated total non-counting time.

* * * * *